(12) United States Patent
Dogimont et al.

(10) Patent No.: US 9,701,571 B2
(45) Date of Patent: Jul. 11, 2017

(54) SHEET OF GLASS WITH HIGH INFRARED RADIATION TRANSMISSION

(71) Applicant: AGC GLASS EUROPE, Louvain-la-Neuve (BE)

(72) Inventors: Audrey Dogimont, Sart-Dames-Avelines (BE); Thomas Lambricht, Perwez (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/889,510

(22) PCT Filed: Apr. 25, 2014

(86) PCT No.: PCT/EP2014/058438
§ 371 (c)(1),
(2) Date: Nov. 6, 2015

(87) PCT Pub. No.: WO2014/180679
PCT Pub. Date: Nov. 13, 2014

(65) Prior Publication Data
US 2016/0083291 A1  Mar. 24, 2016

(30) Foreign Application Priority Data
May 7, 2013  (BE) .................................. 2013/0312

(51) Int. Cl.
| | |
|---|---|
| *B32B 17/00* | (2006.01) |
| *B32B 15/00* | (2006.01) |
| *C03C 4/10* | (2006.01) |
| *C03C 3/087* | (2006.01) |
| *B08B 17/06* | (2006.01) |
| *G06F 3/042* | (2006.01) |

(52) U.S. Cl.
CPC .............. *C03C 4/10* (2013.01); *B08B 17/065* (2013.01); *C03C 3/087* (2013.01); *G06F 3/0421* (2013.01); *G06F 2203/04109* (2013.01)

(58) Field of Classification Search
USPC ....... 428/426, 428, 432, 688, 689, 697, 699, 428/701, 702
See application file for complete search history.

(56) References Cited

U.S. PATENT DOCUMENTS

| | | | | |
|---|---|---|---|---|
| 6,461,736 B1 * | 10/2002 | Nagashima | ............ | C03C 3/087 428/426 |
| 7,763,678 B2 * | 7/2010 | Yamaya | ............... | C09D 183/14 428/447 |
| 9,028,967 B2 * | 5/2015 | Koike | .................... | C03C 3/085 428/410 |
| 2004/0110625 A1 * | 6/2004 | Smith | ................... | C03B 5/2353 501/72 |
| 2006/0211563 A1 * | 9/2006 | Arbab | .................... | C03C 3/087 501/70 |
| 2006/0249199 A1 | 11/2006 | Thomsen et al. | | |
| 2007/0161492 A1 * | 7/2007 | Smith | .................... | C03C 1/002 501/64 |
| 2010/0154477 A1 | 6/2010 | Thomsen et al. | | |
| 2013/0021300 A1 | 1/2013 | Wassvik | | |
| 2013/0142994 A1 * | 6/2013 | Wang | ...................... | C03C 15/00 428/141 |
| 2014/0092052 A1 * | 4/2014 | Grunthaner | ............. | G06F 3/044 345/174 |
| 2014/0152914 A1 * | 6/2014 | King | ........................ | C03C 3/00 349/12 |

FOREIGN PATENT DOCUMENTS

| | | |
|---|---|---|
| DE | 10 2009 056 757 | 6/2011 |
| JP | 2006 36626 | 2/2006 |
| WO | WO2012-128180 | * 9/2012 |

OTHER PUBLICATIONS

Volf ("Chemical Approach to Glass").*
International Search Report Issued Jul. 7, 2014 in PCT/EP2014/058438 filed Apr. 25, 2014.
Guloyan, Yu A. et al., "Kinetics of Chromium Oxide Transformations in Glass Melting", Glass and Ceramics, XP019220454, vol. 62, No. 7-8, pp. 231-234, 2005.

* cited by examiner

Primary Examiner — Lauren R Colgan
(74) Attorney, Agent, or Firm — Oblon, McClelland, Maier & Neustadt, L.L.P.

(57) ABSTRACT

The invention relates to a glass sheet with high IR transmission. More precisely, the invention relates to a glass sheet having a composition comprising in a content expressed in percentages of the total weight of the glass:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5% |
| total iron (expressed in the form of $Fe_2O_3$) | 0.002-0.4% | and chromium in a content such as: 0.0001%<$Cr_2O_3$<0.002%, expressed in percentages of the total weight of glass. The invention also relates to the use of such a glass sheet in a device using an infrared radiation that propagates essentially inside said sheet. Because of its high IR transmission the glass sheet according to the invention can be advantageously used, for example, in a screen or panel or pad, wherein the glass sheet defines a touch sensitive surface.

17 Claims, No Drawings

SHEET OF GLASS WITH HIGH INFRARED RADIATION TRANSMISSION

FIELD OF THE INVENTION

The present invention relates to a glass sheet with high infrared transmission.

The invention also relates to the use of such a glass sheet in a device using infrared radiation propagating essentially inside said sheet.

Because of its high infrared (IR) transmission, the glass sheet according to the invention can in fact be used advantageously in a touchscreen or touch panel or touchpad using optical technology called planar scatter detection (PSD) or frustrated total internal reflection (FTIR) (or any other technology that requires a high IR transmission) to detect the position of one or more objects (e.g. a finger or a stylus) on a surface of said sheet.

Consequently, the invention also relates to a touchscreen, a touch panel or a touchpad comprising such a glass sheet.

Solutions of the Prior Art

PSD and FTIR technologies allow multiple detection touchscreens/panels to be obtained that are inexpensive and that can have a relatively significant touch-sensitive surface (for example, 3 to 100 inches) while also having a low thickness.

These two technologies involve:
(i) injection of infrared radiation (IR) by means of LEDs, for example, into a infrared transparent substrate from one or several edges/sides;
(ii) propagation of the infrared radiation inside said substrate (which thus acts as waveguide) by means of an optical phenomenon of total internal reflection (no radiation "exits" from the substrate);
(iii) contact of the surface of the substrate with any object (for example, a finger or stylus) causing a local disturbance by diffusion of the radiation in all directions; some of the deviated rays will thus be able to "exit" from the substrate.

In FTIR technology the deviated rays form an infrared light point on the inside surface of the substrate opposite the touch sensitive surface. These are seen by a special camera located below the device.

PSD technology itself involves two additional steps to the list of steps (i)-(iii):
(iv) analysis of the resulting IR radiation at the level of the edge of the substrate by a detector; and
(v) calculation by algorithms of the position(s) of the object(s) in contact with the surface from the radiation detected. This technology is disclosed in particular in document US 2013/021300 A1.

Basically, glass is a material of choice for touch panels because of its mechanical properties, its durability, its scratch resistance, its optical clarity and because it can be chemically or thermally strengthened.

In the case of glass panels used for PSD or FTIR technologies with a very substantial surface area and therefore with a relatively large length/width, the optical path of the injected IR radiation is long. In this case, the absorption of the IR radiation by the material of the glass has a significant effect on the sensitivity of the touch panel, which can then decrease undesirably in the length/width of the panel. In the case of glass panels used for PSD or FTIR technologies with a smaller surface area and therefore with a shorter optical path of the injected IR radiation, the absorption of the IR radiation by the material of the glass also has an effect particularly on the energy consumption of the device into which the glass panel is integrated.

Therefore, a glass sheet that is highly transparent to infrared radiation is of great use in this context in order to guarantee an unimpaired or sufficient sensitivity over the whole of the touch sensitive surface when this surface is substantial. In particular, a glass sheet that has the lowest possible absorption coefficient at the wavelength of 1050 nm generally used in these technologies is desired.

To obtain a high infrared transmission (as well as transmission in the visible) it is known to reduce the total content of iron in the glass (expressed in terms of $Fe_2O_3$ according to standard practice in the field) to obtain low-iron glasses. Silicate type glasses always contain iron as this is present as an impurity in most of the raw materials used (sand, lime, dolomite . . . ). Iron exists in the structure of the glass in the form of ferric irons $Fe^{3+}$ and ferrous ions $Fe^{2+}$. The presence of ferric ions $Fe^{3+}$ gives the glass a slight absorption of low wavelength visible light and a higher absorption in the near ultraviolet (absorption band centred on 380 nm), while the presence of ferrous ions $Fe^{2+}$ (sometimes expressed as oxide FeO) causes a high absorption in the near infrared (absorption band centred on 1050 nm). Thus, the increase in the total iron content (in its two forms) accentuates the absorption in the visible and the infrared. Moreover, a high concentration of ferrous ions $Fe^{2+}$ causes a decrease in the transmission in the infrared (in particular the near infrared). However, to obtain an absorption coefficient at wavelength 1050 nm that is sufficiently low for touch sensitive applications solely by acting on the total iron content, such a significant decrease in the total iron content would be required that (i) either it would incur production costs that are much too high as a result of the need for very pure raw materials (which sometimes do not even exist in sufficiently pure state), (ii) or this would pose production problems (in particular premature wear of the furnace and/or difficulties in heating the glass in the furnace).

To further increase the transmission of glass, it is also known to oxidise the iron present in the glass, i.e. to reduce the content of ferrous ions in favour of the content of ferric ions. The degree of oxidation of a glass is given by its redox defined as the atomic weight ratio of $Fe^{2+}$ in relation to the total weight of the iron atoms present in the glass, $Fe^{2+}$/total Fe.

In order to reduce the redox of the glass it is known to add an oxidising component to the batch of raw materials. However, the majority of known oxidising agents (sulphates, nitrates . . . ) do not have a sufficiently high oxidising power to obtain the IR transmission values sought for application to touch panels using FTIR or PSD technology or must be added to too high a quantity with collateral disadvantages such as cost, colouration, incompatibility with the production process etc.

OBJECTIVES OF THE INVENTION

The objective of the invention in at least one of its embodiments is to provide a glass sheet with a high infrared transmission. In particular, an object of the invention is to provide a glass sheet with a high transmission to near infrared radiation.

The objective of the invention in at least one of its embodiments is to provide a glass sheet with a high infrared transmission that in particular is especially advantageous in a device using an infrared radiation that propagates essentially inside said sheet.

Another objective of the invention in at least one of its embodiments is to provide a glass sheet which, when used as touch sensitive surface in touchscreens, touch panels or touchpads of large dimension, does not cause any loss of sensitivity of the touch sensitive function, or if so very little.

Another objective of the invention in at least one of its embodiments is to provide a glass sheet which, when used as touch sensitive surface in touchscreens, touch panels or touchpads of more moderate dimensions, is beneficial to the energy consumption of the device.

Another objective of the invention in at least one of its embodiments is to provide a glass sheet with a high infrared transmission and with an acceptable aesthetic appearance for the chosen application.

Finally, the objective of the invention is also to provide a glass sheet with a high infrared transmission that is inexpensive to produce.

OUTLINE OF THE INVENTION

The invention relates to a glass sheet having a composition comprising in a content expressed in percentages of the total weight of the glass:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5% |
| total iron (expressed in the form of $Fe_2O_3$) | 0.002-0.4%. |

In accordance with a particular embodiment said composition additionally comprises chromium in a content such as: $0.0001\% < Cr_2O_3 < 0.002\%$, expressed in percentages of the total weight of glass.

Thus, the invention is based on a completely novel and inventive approach since it enables the posed technical problem to be solved. In fact the inventors have surprisingly shown that it was possible to obtain a highly IR transparent glass sheet without too negative an impact on its aesthetic appearance, its colour, by combining in a glass composition a low content of iron and of chromium, especially known as a powerful colouring agent in so-called "selective" coloured glasses, in a specific content range.

In the whole of the present text, unless otherwise stated, the end values are included when a range is indicated. Moreover, all the whole and sub-domain values in a numerical range are expressly included as if explicitly stated. Likewise, in the whole of the present text, unless explicitly mentioned, the percentage content values are weight values expressed in relation to the total weight of the glass.

Other features and advantages of the invention will become clearer on reading the following description.

In the sense of the invention glass is understood to mean a material that is completely amorphous, and thus excludes any crystalline material, even partially (such as vitrocrystalline or glass ceramic materials, for example).

The glass sheet according to the invention is made from glass that can be from various categories. Thus, the glass can be a soda-lime-silica, alumino-silicate or borosilicate etc. type of glass. Preferably and for reasons of lower production costs, the glass sheet according to the invention is a soda-lime-silica glass. According to this preferred embodiment the composition of the glass sheet can comprise the following in a content expressed in percentages of the total weight of glass:

| | |
|---|---|
| $SiO_2$ | 60-75% |
| $Al_2O_3$ | 0-4% |
| $B_2O_3$ | 0-4% |
| CaO | 1-15% |
| MgO | 0-10% |
| $Na_2O$ | 5-20% |
| $K_2O$ | 0-10% |
| BaO | 0-5% |
| total iron (expressed in the form of $Fe_2O_3$) | 0.002-0.04% | and chromium in a content such as: $0.0001\% < Cr_2O_3 < 0.002\%$, expressed in percentages of the total weight of glass.

The glass sheet according to the invention can be a glass sheet obtained by a float, drawing or laminating process or any other known process for fabricating a glass sheet from a molten glass composition. According to a preferred embodiment of the invention the glass sheet is a sheet of float glass. A sheet of float glass is understood to be a glass sheet formed by the float process that consists of pouring the molten glass onto a molten tin bath in reductive conditions. In a known manner, a sheet of float glass comprises a so-called "tin face", i.e. a face enriched with tin in the bulk of the glass close to the surface of the sheet. Tin enrichment is understood to mean an increase in the concentration of tin in relation to the core composition of the glass which can be substantially zero (devoid of tin) or not.

According to the invention different raw materials containing chromium can be used to introduce chromium into the glass composition. In particular, chromium oxides, CrO, $Cr_2O_3$, $CrO_2$ or $CrO_3$ are possible, and relatively pure, sources of chromium. Other substances that are rich in chromium can also be used such as chromates, chromites and any other chromium-based chemical compound. However, compounds containing chromium in its 6+ form are less preferred for reasons of safety.

The glass sheet according to the invention can have various and relatively significant dimensions. For example, it can have dimensions ranging up to 3 m×6 m or 3.21 m×5.50 m or 3.21 m×5.10 m or 3.21 m×4.50 m (referred to as a PLF glass sheet) or also, for example, 3.21 m×2.55 m or 3.21 m×2.25 m (referred to as a DLF glass sheet).

The glass sheet according to the invention can have a thickness in the range of between 0.1 and 25 mm. Advantageously, in the case of the application for touch panels, the glass sheet according to the invention can have a thickness in the range of between 0.1 and 6 mm. Preferably for reasons of weight in the case of the application for touch panels, the thickness of the glass sheet according to the invention is from 0.1 to 2.2 mm.

According to the invention the composition of the invention has a content of total iron (expressed in terms of $Fe_2O_3$) ranging from 0.002 to 0.04% by weight in relation to the total weight of the glass. A content of total iron (expressed in the form of $Fe_2O_3$) of less than or equal to 0.04% by weight enables the IR transmission of the glass sheet to be increased further. The minimum value means that the cost of the glass will not be disadvantaged too much, since such low iron values often require costly very pure raw materials or the purification of raw materials. The composition preferably has a content of total iron (expressed in the form of $Fe_2O_3$) ranging from 0.002 to 0.02% by weight in relation to the total weight of the glass. Particularly preferred, the composition has a content of total iron (expressed in the form of $Fe_2O_3$) ranging from 0.002 to 0.01% by weight in relation to the total weight of the glass.

According to an advantageous embodiment of the invention the composition of the invention has a chromium/total iron ratio such as: $0.05 \leq Cr_2O_3/Fe_2O_3 \leq 1$. According to this embodiment, the composition preferably has a chromium/total iron ratio such as: $0.1 < Cr_2O_3/Fe_2O_3 \leq 1$. Such a chromium/total iron ratio range enables a significant transmission in the IR to be obtained without disadvantaging the aesthetic appearance, the colouration of the glass sheet. Particularly preferred, the composition has a chromium/total iron ratio such as: $0.15 \leq Cr_2O_3/Fe_2O_3 \leq 1$. Alternatively, the composition has a chromium/total iron ratio such as: $0.1 < Cr_2O_3/Fe_2O_3 \leq 0.5$.

According to a particularly advantageous embodiment of the invention the composition has a chromium content such as: $0.0005\% \leq Cr_2O_3 \leq 0.002\%$. Particularly preferred, the composition has a chromium content such as: $0.001\% < Cr_2O_3 < 0.002\%$. Such a range of chromium contents enables an improved transmission in the IR to be obtained.

According to another embodiment of the invention the composition has a content of $Fe^{2+}$ (expressed in the form of FeO) of less than 20 ppm. This range of contents enables very satisfactory properties to be obtained, in particular in terms of IR transmission. The composition preferably has a content of $Fe^{2+}$ (expressed in the form of FeO) of less than 10 ppm. Particularly preferred, the composition has a content of $Fe^{2+}$ (expressed in the form of FeO) of less than 5 ppm.

According to the invention the glass sheet has a higher IR transmission. More precisely, the glass sheet of the present invention has a high transmission of radiation in the near infrared. To quantify the high transmission of the glass in the infrared range, the absorption coefficient at the wavelength 1050 nm, which should thus be as low as possible in order to obtain a high transmission, will be used in the present invention. The absorption coefficient is defined by the relation between the absorbance and the length of the optical path covered by an electromagnetic radiation in a given medium. It is expressed in $m^{-1}$. It is therefore independent of the thickness of the material, but depends on the wavelength of the absorbed radiation and the chemical nature of the material.

In the case of the glass the absorption coefficient ($\mu$) at a chosen wavelength $\lambda$, can be calculated from a measurement in transmission (T) as well as the refractive index n of the material (thick=thickness), wherein the values of n, p and T are a function of the chosen wavelength $\lambda$:

$$\mu = -\frac{1}{thick} \cdot \ln\left[\frac{-(1-\rho)^2 + \sqrt{(1-\rho)^4 + 4 \cdot T^2 \cdot \rho^2}}{2 \cdot T \cdot \rho^2}\right]$$

where $\rho = (n-1)^2/(n+1)^2$

Advantageously, the glass sheet according to the invention has an absorption coefficient at wavelength 1050 nm of less than or equal to 5 $m^{-1}$. Preferably, the glass sheet according to the invention has an absorption coefficient at wavelength 1050 nm of less than or equal to 3.5 $m^{-1}$. Particularly preferred, the glass sheet according to the invention has an absorption coefficient at wavelength 1050 nm of less than or equal to 2 $m^{-1}$. Even more preferred, the glass sheet according to the invention has an absorption coefficient at wavelength 1050 nm of less than or equal to 1 $m^{-1}$.

Advantageously, the glass sheet according to the invention has an absorption coefficient at wavelength 950 nm of less than or equal to 5 $m^{-1}$. Preferably, the glass sheet according to the invention has an absorption coefficient at wavelength 950 nm of less than or equal to 3.5 $m^{-1}$. Particularly preferred, the glass sheet according to the invention has an absorption coefficient at wavelength 950 nm of less than or equal to 2 $m^{-1}$. Even more preferred, the glass sheet according to the invention has an absorption coefficient at wavelength 950 nm of less than or equal to 1 $m^{-1}$.

Advantageously, the glass sheet according to the invention has an absorption coefficient at wavelength 850 nm of less than or equal to 5 $m^{-1}$. Preferably, the glass sheet according to the invention has an absorption coefficient at wavelength 850 nm of less than or equal to 3.5 $m^{-1}$. Particularly preferred, the glass sheet according to the invention has an absorption coefficient at wavelength 850 nm of less than or equal to 2 $m^{-1}$. Even more preferred, the glass sheet according to the invention has an absorption coefficient at wavelength 850 nm of less than or equal to 1 $m^{-1}$.

According to an embodiment of the invention, in addition to the impurities contained in particular in the raw materials, the composition of the glass sheet can comprise a small proportion of additives (such as agents aiding the melting or refining of the glass) or elements originating from the dissolution of the refractory materials forming the melting furnaces.

According to an embodiment of the invention the composition of the glass sheet can additionally comprise one or more colouring agents in a quantity adjusted as a function of the sought effect. This(these) colouring agent(s) can serve, for example, to "neutralise" the colour generated by the presence of the chromium and thus make the colouration of the glass of the invention more neutral, colourless. Alternatively, this(these) colouring agent(s) can serve to obtain a desired colour other than that generated by the presence of the chromium.

According to another advantageous embodiment of the invention that may be combined with the preceding embodiment, the glass sheet can be coated with a layer or a film that enables the colour that can be generated by the presence of chromium to be modified or neutralised (e.g. a film of coloured PVB).

The glass sheet according to the invention can advantageously be chemically or thermally toughened.

According to an embodiment of the invention the glass sheet is coated with at least one thin electrically conductive transparent layer. A thin electrically conductive transparent layer according to the invention can be, for example, a layer based on $SnO_2$:F, $SnO_2$:Sb or ITO (indium tin oxide), ZnO:Al or also ZnO:Ga.

According to another advantageous embodiment of the invention the glass sheet is coated with at least one antireflective (or antiglare) layer. This embodiment is clearly advantageous when the glass sheet is used as the front face of a screen. An antireflective layer according to the invention can be, for example, a layer based on porous silica with a low refractive index or can be formed from several layers (lamination), in particular a lamination of layers of dielectric material alternating layers of low and high refractive index and terminating with a layer of low refractive index.

According to another embodiment the glass sheet is coated with at least one anti-fingerprint layer or has been treated in order to reduce/prevent fingerprints from showing. This embodiment is also advantageous in the case where the glass sheet of the invention is used as the front face of a touch screen. Such a layer or such a treatment can be combined with a thin electrically conductive transparent deposited on the opposite face. Such a layer can be combined with an antireflective layer deposited on the same face, wherein the anti-fingerprint layer is on the outside of the lamination and thus covers the antireflective layer.

According to a further embodiment the glass sheet is coated with at least one layer (or has been treated) in order to reduce of prevent reflections and/or the phenomenon of sparkling. This embodiment is certainly advantageous in the case of the glass sheet of the invention being used as front face of a display device. Such an antireflective and/or anti-sparkling treatment is, for example, an acid delustering process that produces a specific roughness of the treated face of the glass sheet.

Depending on the desired applications and/or properties, other layer(s)/treatment(s) can be deposited/conducted on one face or the other of the glass sheet according to the invention.

In addition, the invention also relates to a screen or panel or pad comprising at least one glass sheet according to the invention, wherein said glass sheet defines a touch sensitive surface. The touchscreen or panel or pad preferably uses FTIR or PSD optical technology. In particular, the glass sheet is advantageously mounted on top of the display surface.

Finally, the invention also relates to the use of a glass sheet having a composition that comprises the following in a content expressed in percentages of the total weight of glass:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5% |
| total iron (expressed in the form of $Fe_2O_3$) | 0.002-0.04% | chromium in a content such as: $0.0001\% < Cr_2O_3 < 0.002\%$ in a device using an infrared radiation that propagates essentially inside said sheet. The term radiation that propagates essentially inside the sheet is understood to mean a radiation that travels in the bulk of the glass sheet between the two main faces of the sheet.

Advantageously, according to an embodiment of the use of the invention the propagation of the infrared radiation occurs by total internal reflection. According to this embodiment the infrared radiation can be injected inside the glass sheet from one or more sides of said sheet. Side of the sheet is understood to be each of the four surfaces defined by the thickness of the sheet and substantially perpendicular to the two main faces of the sheet. Alternatively, still according to this embodiment, the infrared radiation can be injected inside the glass sheet from one or both of the main faces at a certain angle.

According to another embodiment of the use of the invention, the composition advantageously has a chromium/total iron ratio such as: $0.05 \leq Cr_2O_3/Fe_2O_3 \leq 1$, and preferably a chromium/total iron ratio such as: $0.1 < Cr_2O_3/Fe_2O_3 \leq 1$ or such as: $0.15 \leq Cr_2O_3/Fe_2O_3 \leq 1$.

According to another embodiment of the invention the composition advantageously has a chromium content such as: $0.0005\% \leq Cr_2O_3 < 0.002\%$ and preferably a chromium content such as: $0.001\% < Cr_2O_3 < 0.002\%$.

According to another embodiment of the invention the composition advantageously has a content of total iron (expressed in the form of $Fe_2O_3$) of 0.002 to 0.02% by weight in relation to the total weight of the glass, and preferably a content of total iron (expressed in the form of $Fe_2O_3$) of 0.002 to 0.01% b weight in relation to the total weight of the glass.

The following examples illustrate the invention without intention of limiting its coverage in any way.

EXAMPLES

The raw materials have been mixed in powder form and placed in a melting pot in accordance with the base composition specified in the table below.

| Base Composition | Content [% by weight] |
|---|---|
| $SiO_2$ | 72 |
| CaO | 8.2 |
| $K_2O$ | 0.01 |
| $Na_2O$ | 14 |
| $SO_3$ | 0.3 |
| $Al_2O_3$ | 1 |
| MgO | 4.5 |

Different samples were prepared with variable quantities of chromium and iron and the base composition was kept fixed. Samples 1 and 5 (comparative) correspond to glasses of the prior art with a low iron content and without added chromium (referred to as "extra clear"), and respectively comprise 120 and 1000 ppm of iron expressed in the form of $Fe_2O_3$. Samples 2-4 correspond to compositions of the glass sheet according to the invention with an iron content of 120 ppm (expressed in the form of $Fe_2O_3$) and samples 6-9 correspond to compositions of the glass sheet according to the invention with an iron content of 100 ppm (expressed in the form of $Fe_2O_3$).

The optical properties of each glass sample in sheet form were determined and in particular the absorption coefficient (μ) at wavelengths of 1050, 950 and 850 nm was determined by a transmission measurement on a Perkin Elmer lambda 950 spectrophotometer fitted with an integrating sphere 150 mm in diameter, the sample being placed at the inlet port of the sphere for the measurement.

The table below shows the variation (Δ) of the absorption coefficient at wavelengths 1050, 950 and 850 nm, and the variation in $Fe^{2+}$ (ppm), obtained for the samples according to the invention in relation to the value for the corresponding reference sample (without chromium).

| Set of Samples A | ppm of chromium (expressed in the form of $Cr_2O_3$) | ppm of iron (expressed in the form of $Fe_2O_3$) | ppm $Fe2+$ | Absorption coefficient at 1050 nm $(m^{-1})$ | Absorption coefficient at 950 nm $(m^{-1})$ | Absorption coefficient at 850 nm $(m^{-1})$ |
|---|---|---|---|---|---|---|
| 1 (comparative) | 0 (no addition in the mixture) | 120 | 28.8 | 6.3 | 6.10 | 5.01 |
| 2 | 3.5 | | 19.7 | 4.62 | 4.40 | 3.43 |

| Set of Samples A | ppm of chromium (expressed in the form of $Cr_2O_3$) | ppm of iron (expressed in the form of $Fe_2O_3$) | ppm $Fe^{2+}$ | Absorption coefficient at 1050 nm ($m^{-1}$) | Absorption coefficient at 950 nm ($m^{-1}$) | Absorption coefficient at 850 nm ($m^{-1}$) |
|---|---|---|---|---|---|---|
| 3 | 9 | | 16.8 | 3.17 | 3.20 | 2.92 |
| 4 | 13 | | 9.8 | 2.71 | 2.47 | 1.70 |

| Set of Samples B | ppm of chromium (expressed in the form of $Cr_2O_3$) | ppm of iron (expressed in the form of $Fe_2O_3$) | ppm $Fe^{2+}$ | Absorption coefficient at 1050 nm ($m^{-1}$) | Absorption coefficient at 950 nm ($m^{-1}$) | Absorption coefficient at 850 nm ($m^{-1}$) |
|---|---|---|---|---|---|---|
| 5 (comparative) | 0 (no addition in the mixture) | 100 | 23.9 | 5.22 | 5.06 | 4.16 |
| 6 | 3 | | 19.5 | 4.10 | 4.02 | 3.40 |
| 7 | 6.5 | | 14.7 | 3.42 | 3.29 | 2.56 |
| 8 | 8 | | 15.1 | 2.40 | 2.22 | 2.63 |
| 9 | 13 | | 8.9 | 1.50 | 1.46 | 1.55 |

These results show that the addition of chromium in a range of contents according to the invention enables the absorption coefficient at each of the wavelengths of 1050, 950 and 850 nm to be significantly decreased, and therefore in general enables the absorption of radiation in the near infrared to be reduced.

The invention claimed is:

1. A glass sheet comprising, in weight percentages in relation to the total weight of the glass sheet:
   55-78% of $SiO_2$,
   0-18% of $Al_2O_3$,
   0-18% of $B_2O_3$,
   0-20% of $Na_2O$,
   0-15% of CaO,
   0-10% of MgO,
   0-10% of $K_2O$,
   0-5% of BaO,
   0.002-0.02% of total iron as expressed in the form of $Fe_2O_3$, and
   0.0001%<$Cr_2O_3$<0.002%,
   wherein the glass sheet has an absorption coefficient at a wavelength 850 nm of less than or equal to 3.5 $m^{-1}$ and wherein the glass sheet comprises $Fe^{2+}$ (expressed in the form of FeO) of less than 20 ppm.

2. The glass sheet according to claim 1, wherein 0.05≤$Cr_2O_3$/$Fe_2O_3$≤1.

3. The glass sheet according to claim 1, wherein 0.1≤$Cr_2O_3$/$Fe_2O_3$≤1.

4. The glass sheet according to claim 1, comprising 0.0005%≤$Cr_2O_3$<0.002%.

5. The glass sheet according to claim 1, comprising 0.001%<$Cr_2O_3$<0.002%.

6. The glass sheet according to claim 1, comprising:
   60-75% of $SiO_2$,
   0-4% of $Al_2O_3$,
   0-4% of $B_2O_3$,
   5-20% of $Na_2O$,
   1-15% of CaO,
   0-10% of MgO,
   0-10% of $K_2O$,
   0-5% of BaO,
   0.002-0.02% of total iron as expressed in the form of $Fe_2O_3$, and
   0.0001%<$Cr_2O_3$<0.002%.

7. The glass sheet according to claim 1, having an absorption coefficient at wavelength 1050 nm of less than or equal to 5 $m^{-1}$.

8. The glass sheet according to claim 7, having an absorption coefficient at wavelength 1050 nm of less than or equal to 3.5 $m^{-1}$.

9. The glass sheet according to claim 8, having an absorption coefficient at wavelength 1050 nm of less than or equal to 2 $m^{-1}$.

10. The glass sheet according to claim 1, being coated with at least one anti-fingerprint layer or treated in order to reduce/prevent fingerprints from showing.

11. A screen, a panel, or a pad comprising at least one glass sheet according to claim 1, wherein said glass sheet defines a touch sensitive surface.

12. The screen, the panel, or the pad according to claim 11, having FTIR or PSD optical technology.

13. A glass sheet comprising, in weight percentages in relation to the total weight of the glass sheet:
   55-78% of $SiO_2$,
   0-18% of $Al_2O_3$,
   0-18% of $B_2O_3$,
   0-20% of $Na_2O$,
   0-15% of CaO,
   0-10% of MgO,
   0-10% of $K_2O$,
   0-5% of BaO,
   0.002-0.02% of total iron as expressed in the form of $Fe_2O_3$, and
   0.0001%<$Cr_2O_3$<0.002%,
   wherein the glass sheet has an absorption coefficient at a wavelength 850 nm of less than or equal to 3.5 $m^{-1}$,
   wherein the glass sheet is formed by a float process.

14. The glass sheet according to claim 13, wherein the glass sheet has a thickness of 0.1 to 2.2 nm.

15. The glass sheet according to claim 13, wherein 0.05≤$Cr_2O_3$/$Fe_2O_3$≤1.

16. The glass sheet according to claim 13, wherein $0.1<Cr_2O_3/Fe_2O_3<1$.

17. The glass sheet according to claim 13, comprising $0.001\%<Cr_2O_3<0.002\%$.

* * * * *